(12) United States Patent
Dorwin

(10) Patent No.: US 10,572,633 B1
(45) Date of Patent: Feb. 25, 2020

(54) METHOD, MANUFACTURE, AND APPARATUS FOR INSTANTIATING PLUGIN FROM WITHIN BROWSER

(71) Applicant: Google LLC, Mountain View, CA (US)

(72) Inventor: David Kimbal Dorwin, Kirkland, WA (US)

(73) Assignee: Google LLC, Mountain View, CA (US)

(*) Notice: Subject to any disclaimer, the term of this patent is extended or adjusted under 35 U.S.C. 154(b) by 236 days.

(21) Appl. No.: 15/400,927

(22) Filed: Jan. 6, 2017

Related U.S. Application Data

(63) Continuation of application No. 13/711,481, filed on Dec. 11, 2012, now Pat. No. 9,542,368.

(60) Provisional application No. 61/569,755, filed on Dec. 12, 2011.

(51) Int. Cl.
| | | |
|---|---|---|
| *G06F 21/10* | (2013.01) | |
| *H04L 9/08* | (2006.01) | |
| *H04L 29/06* | (2006.01) | |
| *H04L 9/32* | (2006.01) | |
| *G06F 21/62* | (2013.01) | |

(52) U.S. Cl.
CPC ............. *G06F 21/10* (2013.01); *G06F 21/62* (2013.01); *H04L 9/0861* (2013.01); *H04L 9/32* (2013.01); *H04L 63/06* (2013.01); *H04L 65/80* (2013.01); *G06F 2221/0759* (2013.01); *H04L 2209/603* (2013.01); *H04L 2463/101* (2013.01)

(58) Field of Classification Search
CPC ........................................................ G06F 17/00
See application file for complete search history.

(56) References Cited

U.S. PATENT DOCUMENTS

| | | |
|---|---|---|
| 4,535,355 A | 8/1985 | Arn et al. |
| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,191,611 A | 3/1993 | Lang |
| 5,339,413 A | 8/1994 | Koval et al. |
| 5,375,168 A | 12/1994 | Kudelski |
| 5,392,351 A | 2/1995 | Hasebe et al. |
| 5,487,167 A | 1/1996 | Dinallo et al. |
| 5,539,450 A | 7/1996 | Handelman |

(Continued)

FOREIGN PATENT DOCUMENTS

| | | |
|---|---|---|
| EP | 0658054 A2 | 6/1995 |
| EP | 0714204 A2 | 5/1996 |

(Continued)

OTHER PUBLICATIONS

Didner et al., "Intelligent Systems for Finance and Business," University College London, Dec. 1995, pp. 31-173.

(Continued)

*Primary Examiner* — James J Debrow
(74) *Attorney, Agent, or Firm* — Shumaker & Sieffert, P.A.

(57) ABSTRACT

A method, apparatus, and manufacture for instantiating a browser plugin is provided. A client web browser of a client is employed to instantiate a browser plugin for the client web browser. Next, the client web browser is employed to obtain a reference to the browser plugin. Then, a command is given to the browser plugin via the reference to the browser plugin. The browser plugin is used by the client web browser rather than the web page.

21 Claims, 9 Drawing Sheets

(56) References Cited

U.S. PATENT DOCUMENTS

| | | |
|---|---|---|
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,689,565 A | 11/1997 | Spies et al. |
| 5,758,257 A | 5/1998 | Herz |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,974,549 A | 10/1999 | Golan |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,141,753 A | 10/2000 | Zhao et al. |
| 6,157,721 A | 12/2000 | Shear et al. |
| 6,160,891 A | 12/2000 | Al-Salqan |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,618 B1 | 5/2001 | Downs et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelman et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,332,194 B1 | 12/2001 | Bloom et al. |
| 6,334,213 B1 | 12/2001 | Li |
| 6,363,488 B1 | 3/2002 | Ginter et al. |
| 6,385,596 B1 | 5/2002 | Wiser et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,460,023 B1 | 10/2002 | Bean et al. |
| 6,466,670 B1 | 10/2002 | Tsuria et al. |
| 6,505,299 B1 | 1/2003 | Zeng et al. |
| RE38,070 E | 4/2003 | Spies et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,633,918 B2 | 10/2003 | Agarwal et al. |
| 6,634,028 B2 | 10/2003 | Handelman |
| 6,640,304 B2 | 10/2003 | Ginter et al. |
| 6,643,621 B1 * | 11/2003 | Dodrill et al. .......... G06F 15/73 |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,792,113 B1 | 9/2004 | Ansell et al. |
| 7,007,170 B2 | 2/2006 | Morten |
| 7,120,871 B1 | 10/2006 | Harrington |
| 7,142,648 B1 | 11/2006 | Miller |
| 7,165,175 B1 | 1/2007 | Kollmyer et al. |
| 7,356,143 B2 | 4/2008 | Morten |
| 7,363,384 B2 | 4/2008 | Chatani et al. |
| 7,523,191 B1 * | 4/2009 | Thomas et al. ......... G06F 15/16 |
| 7,578,002 B2 | 8/2009 | Risan et al. |
| 7,640,435 B2 | 12/2009 | Morten |
| 7,805,616 B1 | 9/2010 | Mohammed et al. |
| 7,814,154 B1 | 10/2010 | Kandekar et al. |
| 7,817,608 B2 | 10/2010 | Rassool et al. |
| 7,827,613 B2 | 11/2010 | Koved et al. |
| 7,953,882 B2 | 5/2011 | Shukla et al. |
| 8,457,311 B1 | 6/2013 | Schultz et al. |
| 8,516,105 B2 | 8/2013 | Chawla et al. |
| 8,560,642 B2 | 10/2013 | Pantos et al. |
| 8,682,722 B1 | 3/2014 | Des Jardins et al. |
| 8,687,114 B2 | 4/2014 | Bennett |
| 8,751,800 B1 | 6/2014 | Dorwin |
| 8,787,454 B1 | 7/2014 | Chechik et al. |
| 8,891,765 B1 | 11/2014 | Dorwin |
| 8,984,285 B1 | 3/2015 | Dorwin et al. |
| 9,003,558 B1 | 4/2015 | Dorwin et al. |
| 9,110,902 B1 | 8/2015 | Dorwin |
| 9,129,092 B1 | 9/2015 | Dorwin et al. |
| 9,183,405 B1 | 11/2015 | Dorwin et al. |
| 9,239,912 B1 | 1/2016 | Dorwin et al. |
| 9,311,459 B2 | 4/2016 | Dorwin |
| 9,326,012 B1 | 4/2016 | Dorwin |
| 9,542,368 B1 * | 1/2017 | Dorwin ................... G06F 17/30 |
| 9,923,988 B2 | 3/2018 | Chen et al. |
| 2002/0001385 A1 | 1/2002 | Kawada et al. |
| 2002/0015498 A1 | 2/2002 | Houlberg et al. |
| 2002/0021761 A1 | 2/2002 | Zhang et al. |
| 2002/0021805 A1 | 2/2002 | Schumann |
| 2002/0037735 A1 | 3/2002 | Maggenti et al. |
| 2002/0049679 A1 | 4/2002 | Russell et al. |
| 2002/0065844 A1 | 5/2002 | Robinson et al. |
| 2002/0089410 A1 | 7/2002 | Janiak et al. |
| 2002/0104004 A1 | 8/2002 | Couillard |
| 2002/0107803 A1 | 8/2002 | Lisanke et al. |
| 2002/0141582 A1 | 10/2002 | Kocher et al. |
| 2002/0170053 A1 | 11/2002 | Peterka et al. |
| 2003/0007568 A1 | 1/2003 | Hamery et al. |
| 2003/0016949 A1 | 1/2003 | Unger |
| 2003/0037261 A1 | 2/2003 | Meffert et al. |
| 2003/0046568 A1 | 3/2003 | Riddick et al. |
| 2003/0052911 A1 | 3/2003 | Cohen-solal |
| 2003/0118188 A1 | 6/2003 | Collier et al. |
| 2003/0154265 A1 | 8/2003 | Raffaele et al. |
| 2004/0028227 A1 | 2/2004 | Yu |
| 2004/0031856 A1 | 2/2004 | Atsmon et al. |
| 2004/0054909 A1 | 3/2004 | Serkowski |
| 2004/0093396 A1 | 5/2004 | Akune |
| 2004/0111613 A1 | 6/2004 | Shen-Orr et al. |
| 2004/0117500 A1 | 6/2004 | Lindholm et al. |
| 2004/0151315 A1 | 8/2004 | Kim |
| 2004/0184616 A1 | 9/2004 | Morten |
| 2004/0196972 A1 | 10/2004 | Zhu |
| 2004/0230806 A1 | 11/2004 | Lisanke |
| 2005/0021805 A1 | 1/2005 | De Petris et al. |

(56) References Cited

U.S. PATENT DOCUMENTS

| | | |
|---|---|---|
| 2005/0027871 A1 | 2/2005 | Bradley |
| 2005/0066353 A1 | 3/2005 | Fransdonk |
| 2005/0125358 A1 | 6/2005 | Levin et al. |
| 2005/0193205 A1 | 9/2005 | Jacobs et al. |
| 2005/0273862 A1 | 12/2005 | Benaloh et al. |
| 2005/0281531 A1 | 12/2005 | Unmehopa |
| 2006/0005260 A1 | 1/2006 | Haruki |
| 2006/0020811 A1 | 1/2006 | Tan |
| 2006/0066637 A1 | 3/2006 | Hamburg |
| 2006/0174308 A1* | 8/2006 | Fuller et al. ........... H04N 7/173 |
| 2006/0204115 A1 | 9/2006 | Buzazerovic |
| 2006/0212363 A1 | 9/2006 | Peinado et al. |
| 2006/0225107 A1 | 10/2006 | Seetharaman et al. |
| 2006/0280150 A1 | 12/2006 | Jha et al. |
| 2007/0005795 A1 | 1/2007 | Gonzalez |
| 2007/0067321 A1 | 3/2007 | Bissett |
| 2007/0089174 A1 | 4/2007 | Bader et al. |
| 2007/0136372 A1 | 6/2007 | Proctor |
| 2007/0143210 A1 | 6/2007 | Yeung |
| 2007/0160208 A1 | 7/2007 | MacLean et al. |
| 2007/0204300 A1 | 8/2007 | Markley |
| 2007/0209005 A1 | 9/2007 | Shaver et al. |
| 2007/0214482 A1* | 9/2007 | Nguyen ................. H04N 7/173 |
| 2007/0219917 A1 | 9/2007 | Liu et al. |
| 2007/0234291 A1 | 10/2007 | Ronen |
| 2007/0294170 A1 | 12/2007 | Vantalon et al. |
| 2008/0027871 A1 | 1/2008 | Seo |
| 2008/0052641 A1 | 2/2008 | Brown et al. |
| 2008/0098229 A1 | 4/2008 | Hartrell |
| 2008/0137848 A1 | 6/2008 | Kocher |
| 2008/0147671 A1 | 6/2008 | Simon et al. |
| 2008/0155586 A1 | 6/2008 | Yang |
| 2008/0155673 A1 | 6/2008 | Jung et al. |
| 2008/0189604 A1* | 8/2008 | Washburn et al. ...... G06F 17/00 |
| 2008/0267399 A1 | 10/2008 | Medvinsky |
| 2008/0288611 A1 | 11/2008 | Toyomura |
| 2008/0307454 A1 | 12/2008 | Ahanger |
| 2008/0313264 A1 | 12/2008 | Pestoni |
| 2009/0006862 A1 | 1/2009 | Alkove |
| 2009/0007198 A1 | 1/2009 | Lavender et al. |
| 2009/0031408 A1 | 1/2009 | Thom et al. |
| 2009/0044008 A1 | 2/2009 | Lim |
| 2009/0113301 A1* | 4/2009 | Fisher et al. ............ G06F 3/048 |
| 2009/0138332 A1 | 5/2009 | Kanevsky |
| 2009/0144836 A1 | 6/2009 | Gutta |
| 2009/0147854 A1 | 6/2009 | Dane |
| 2009/0183001 A1 | 7/2009 | Lu et al. |
| 2009/0185073 A1 | 7/2009 | MacInnis |
| 2009/0197238 A1 | 8/2009 | Moffatt |
| 2009/0208016 A1 | 8/2009 | Choi et al. |
| 2009/0219994 A1 | 9/2009 | Tu |
| 2009/0249426 A1 | 10/2009 | Aoki et al. |
| 2009/0322786 A1 | 12/2009 | Finger |
| 2009/0327741 A1 | 12/2009 | Zimmer et al. |
| 2010/0023760 A1 | 1/2010 | Lee et al. |
| 2010/0027974 A1 | 2/2010 | Ansari |
| 2010/0030752 A1 | 2/2010 | Goldentouch |
| 2010/0145794 A1 | 6/2010 | Barger et al. |
| 2010/0180289 A1 | 7/2010 | Barsook et al. |
| 2010/0199104 A1 | 8/2010 | Van Rijnswou |
| 2010/0211776 A1 | 8/2010 | Gunaseelan et al. |
| 2010/0235820 A1 | 9/2010 | Khouzam |
| 2010/0242079 A1 | 9/2010 | Riedl |
| 2010/0242097 A1 | 9/2010 | Hotes et al. |
| 2010/0250532 A1 | 9/2010 | Soroushian |
| 2010/0256976 A1 | 10/2010 | Atsmon |
| 2010/0299701 A1 | 11/2010 | Liu et al. |
| 2011/0055904 A1 | 3/2011 | Tstusumi |
| 2011/0066957 A1 | 3/2011 | Prats et al. |
| 2011/0069936 A1 | 3/2011 | Johnson |
| 2011/0131664 A1 | 6/2011 | Jonsson |
| 2011/0145593 A1 | 6/2011 | Auradkar |
| 2011/0173524 A1 | 7/2011 | Chan |
| 2011/0179283 A1 | 7/2011 | Thom et al. |
| 2011/0185013 A1 | 7/2011 | Obata et al. |
| 2011/0194713 A1 | 8/2011 | Apfel |
| 2011/0225417 A1 | 9/2011 | Maharajh et al. |
| 2011/0238983 A1 | 9/2011 | Lotspiech |
| 2011/0251992 A1 | 10/2011 | Bethlehem |
| 2011/0274179 A1 | 11/2011 | Holden |
| 2011/0305273 A1 | 12/2011 | He |
| 2011/0314284 A1 | 12/2011 | Chou |
| 2012/0066494 A1 | 3/2012 | Lee et al. |
| 2012/0079578 A1 | 3/2012 | Dachiraju |
| 2012/0114118 A1 | 5/2012 | Verma |
| 2012/0117183 A1 | 5/2012 | Wong et al. |
| 2012/0124604 A1 | 5/2012 | Small |
| 2012/0151515 A1 | 6/2012 | Atsmon |
| 2012/0173884 A1 | 7/2012 | Patil |
| 2012/0317414 A1 | 12/2012 | Glover |
| 2012/0331293 A1 | 12/2012 | Ma et al. |
| 2013/0072126 A1 | 3/2013 | Topaltzas et al. |
| 2013/0097302 A9 | 4/2013 | Khedouri et al. |
| 2013/0108425 A1 | 5/2013 | Yin |
| 2013/0145406 A1 | 6/2013 | Baskaran |
| 2013/0174222 A1 | 7/2013 | Ogle |
| 2014/0032350 A1 | 1/2014 | Biswas |
| 2014/0130073 A1 | 5/2014 | Yu |

FOREIGN PATENT DOCUMENTS

| | | |
|---|---|---|
| EP | 0852445 A2 | 7/1998 |
| EP | 0886409 A2 | 12/1998 |
| EP | 1134977 A1 | 10/2002 |
| EP | 1246463 A2 | 10/2002 |
| JP | H-03-203432 | 9/1991 |
| JP | H-08-335040 | 12/1996 |
| JP | H-10-336128 | 12/1998 |
| JP | H-11-175475 | 7/1999 |
| JP | 2000-022680 A | 1/2000 |
| JP | 2000-196585 A | 7/2000 |
| JP | 2000-293945 A | 10/2000 |
| JP | 2001-251599 A | 9/2001 |
| WO | WO-96/06504 A1 | 2/1996 |
| WO | WO-96/32702 A1 | 10/1996 |
| WO | WO-99/21364 A1 | 4/1999 |
| WO | WO-99/28842 A1 | 6/1999 |
| WO | WO-99/30499 A1 | 6/1999 |
| WO | WO-01/35571 A1 | 5/2001 |
| WO | WO-99/54453 A1 | 5/2001 |
| WO | WO-01/93212 A2 | 3/2002 |
| WO | WO-02/21761 A2 | 3/2002 |
| WO | WO-2004/02112 A1 | 12/2003 |

OTHER PUBLICATIONS

Hickson, "HTML5 a Vocabulary and Associated APIs for HTML and XHTML, W3C Working Draft," Oct. 19, 2010, http://www.w3.org/TR/2010/WD-html-5-20101019/.

Kloskowski, "Layers,: The Complete Guide to Photoshop's Most Powerful Feature," 2nd Edition, Oct. 2010, Chapter 4, pp. 85-102.

Foliot, "<video> element needs to support some form of DRM solution," Pub date 2010, pp. 1-20.

"A new approach to browser security: the Google Chrome Sandbox," Chromium Blog, Oct. 2, 2008, http://blog.chromium.org/2008/10/new-approach-to-browser-security-google.html, 5 pages.

"Broadband Streaming—Omneon and BskyB," Omneon Video Networks Product Announcement, TB-1006-1, 1998, 4 pages.

"Conditional access," Wikipedia, the free encyclopedia, created Jul. 7, 2005, http://en.wikipedia.org/wiki/Conditional_access, 8 pages.

"Digital rights management," Wikipedia, the free encyclopedia, modified Mar. 30, 2012, http://en.wikipedia.org/w/index.php?title=Digital_rights-management&printavble=yes, 30 pages.

"Encrypted Media Extensions, W3C Editor's Draft Dec. 17, 2012," W3C, crated Feb. 22, 2012, current draft dated Dec. 17, 2012, http://dvcs.w3.org/hg/html-media/raw-file/tip/encrypted-media/encrypted-media.html, 32 pages.

"Establishing Interconnectivity among Various Makers' Products through Standardization of VOD Protocol." NTT Corporation Press Release, Sep. 27, 2002, http://www.ntt.co.jp/news/news02e/0209/020927.html.

(56) References Cited

OTHER PUBLICATIONS

"Getting Started: Background and Basics—The Chromium Projects," Sep. 2, 2008, http://chromium.org/nativeclient/getting-started/getting-started-background-and-basics, 4 pages.
"Google Native Client," Wikipedia, the free encyclopedia, created Dec. 9, 2008, http://en.wikipedia.org/wiki/Google_Native_Client, 6 pages.
"High-bandwidth Digital Content Protection," Wikipedia, the free encyclopedia, modified Nov. 14, 2012 http://en.wikipedia.org/w/index.php?title=High=bandwidth_Digital_Content_Protection&printable=yes, 7 pages.
"HTML5," Wikipedia, the free encyclopedia, created Nov. 6, 2006, http://en.wikipedia.org/wiki/HTML5, 9 pages.
"Irdeto Access and Optibase create Strategic Alliance," Press Release, Irdeto Access, Dec. 14, 2000, http://www.irdetoaccess.com/press/0000041.htm, 4 pages.
"Irdeto Access and Optibase create Strategic Alliance," Press Release, Optibase, Dec. 14, 2000, http://www.optibase.com/html/news/December_14_2000.html, 2 pages.
"Media Source Extensions, W3C Editor's Draft Dec. 18, 2012," created Jul. 11, 2011, current draft dated Dec. 18, 2012, http://dvcs.w3.org/hg/html-media/raw-file/tip/media-source/media-source.html, 25 pages.
"Media Source Extensions," Jul. 11. 2011, http://html5-mediasource-api.googlecode.com/svn/trunk/draft-spec/mediasource-draft-spec,htm, 1 page.
"Multimedia over Coax Alliance," Wikipedia, the free encyclopedia, created Jun. 11, 2006, http://en.wikipedia.org/wiki/Multimedia_over_Coax_Alliance, 4 pages.
"PlayReady," Wikipedia, the free encyclopedia, modified Jan. 30, 2012, http://en.wikipedia.org/w/index.php?title=PlayReady&printable=yes, 2 pages.
"Sandbox—The Chromium Projects," Sep. 2, 2008, http://dev.chromium.org/developers/design-documents/sandbox, 8 pages.
UltraViolet (system), Wikipedia, the free encyclopedia, modified Feb. 20, 2012, http://en.wikipedia.org/w/index.php?title=UltraViolet_(system)&printable=yes, 5 pages.
"W3C HTML Working Group," May 9, 2007, http://www.w3.org/html/wg, 9 pages.
"Web Cryptography Working Group Charter," W30 Technology and Society domain, Apr. 3, 2012, http://www.w3.org/2011/11/webcryptography-charter.html, 6 pages.
"What is HDCP (high definition copy protocol)?" Digital Connection, 2005, http://www.digitalconnection.com/FAQ/HDTV_12.asp, 2 pages.
"Scalable Video Coding," Wikipedia, the free encyclopedia, modified Sep. 10, 2012, http://en.wikipedia.org/w/index.php?title=Scalable_Video_Coding&printable=yes, 4 pages.
Balthorp, et al., "Coverage and Generalization in an Artificial Immune System," Proceedings of Genetic and Evolutionary Computation Conference (GECCO), Jul. 2002, pp. 1-8.
Barth, et al., "The Security Architecture of the Chromium Browser," Technical Report, Stanford University, 2008.
Blumenfeld, "Streaming Media—System Security," Broadcast Engineering Magazine, Oct. 2001, pp. 1-2.
Cheng, "Partial Encryption for Image and Video Communication," Department of Computing Science, University of Alberta, Fall 1998, pp. 1-87.
Cheng, et al., "Partial Encryption of Compressed Images and Videos," IEEE Transactions on Signal Processing, vol. 48, No. 8, Aug. 2000, pp. 2439-2451.
Colwell, "MediaSource Extensions v0.3," Mar. 13, 2012, http://html5-mediasource-api.googlecode.com/svn/tags/0.3/draft-spec/mediasource-draft-spec.html, 14 pages.
Colwell, "Proposal for a MediaSource API that allows sending media data to a HTMLMediaElement," Jul. 11, 2011, p. 1-11, http://lists.whatwg.org/pipermail/whatwg-whatwg.org/2011-July/032384.html.
Dietcher, "Secure implementations of Content Protection (DRM) Schemes on a Consumer Electronic Devices," Discretix, White Paper, May 2011, 17 pages.
Eskicioglu et al., "An Overview of Multimedia Content Protection in Consumer Electronics Devices," SP:IC, Apr. 2001, pp. 681-699, vol. 16, No. 7.
Ferrill et al., "A Survey of Digital Watermarking," Feb. 25, 1999, http://elizabeth.ferrill.com/papers/watermarking.pdf, 15 pages.
Forrest, "Research Projects," Dec. 2, 2003, http://www.cs.umn.edu/about.forrest/projects.html, 3 pages.
Glazkov, "What the Heck is Shadow DOM?," Jan. 14, 2011, http://glazkov.com/2011/01/14/what-the-heck-is-shadow-dom, 14 pages.
Goodman et al., "Low Power Scalable Encryption for Wireless Systems," Wireless Networks, Jan. 1998, pp. 55-70, No. 4.
Goonatilake et al., "Intelligent Systems for Finance and Business," 1995, Chapters 2-10, pp. 31-173.
Griwodz et al., "Protecting VoD the Easier Way," ACM Multimedia, Bristol UK, Jan. 1998, pp. 21-28.
Griwodz, "Video Protection by Partial Content Corruption," Multimedia and Security Workshop at ACM Multimedia, Bristol UK, Sep. 1998, 5 pages.
Hunter et al., "A Review of Video Streaming Over the Internet," DSTC Technical Report TR97-10, Aug. 1997, 28 pages.
Kirovski et al., "Digital Rights Management for Digital Cinema," Proceedings of the SPIE, Bellingham VA, Jul. 31, 2001, pp. 105-120, vol. 4472.
Metz, "Google Native Client: The web of the future—or the past?" The Register, Sep. 12, 2011, http://theregister.co.uk/2011/09/12/google_native_client_from_all_sides/print.html, 13 pages.
Schulzrinne et al., "Real Time Streaming Protocol (RTSP)," RFC 2326, Apr. 1998, 86 pages.
Schulzrinne et al., "RTP: A Transparent Protocol for Real-Time Applications," RFC 1889, Jan. 1998, 75 pages.
Spanos et al., "Performance Study of a Selective Encryption Scheme for the Security of Networked, Real-Time Video," Proceedings of the Fourth international Conference on Computer Communications and Networks, ICCCN '95, Sep. 1995, pp. 2-10.
Teixeira et al., "Secure Transmission of MPEG Video Sources," Proceedings of IEEE Workshop on ISPACS, Nov. 6, 1998, 5 pages.
Wu et al., "Selective Encryption and Watermarking of MPEG Video (Extended Abstract)," submitted to International Conference on Image Science, Systems and Technology, Feb. 17, 1997, 10 pages.
Yee et al., "Native Client: A Sandbox for Portable, Untrusted x86 Native Code," IEEE Symposium on Security and Privacy, May 2009, 15 pages.
Yoshida et al., "A Continuous-Media Communication Method for Minimizing Playback Interruptions," IS&T/SPIE Conference on Visual Communications Imaging and Processing, Jan. 1999, vol. 3653, 10 pages.
Zhang et al., "A Flexible Content Protection System for Media-On-Demand," Proceedings of the Fourth International Symposium on Multimedia Software Engineering, Dec. 2002, pp. 272-277.

\* cited by examiner

METHOD, MANUFACTURE, AND APPARATUS FOR INSTANTIATING PLUGIN FROM WITHIN BROWSER

CROSS-REFERENCE TO RELATED APPLICATION

The present application claims the benefit of priority under 35 U.S.C. § 120 as a continuation of U.S. patent application Ser. No. 13/711,481 entitled, "Method, Manufacture, and Apparatus for Instantiating Plugin From Within Browser." filed on Dec. 11, 2012, which claims the benefit of priority under 35 U.S.C. § 119 from U.S. Provisional Patent Application No. 61/569,755 entitled, "Encrypted Media Extensions for HTML 5 and DRM," filed Dec. 12, 2011, the entirety of each of which is incorporated herein by reference the disclosure of which is hereby incorporated by reference in its entirety for all purposes.

TECHNICAL FIELD

The invention is related to computer software, and in particular, but not exclusively, to a method, manufacture, and apparatus for using the web browser, rather than the web page, to instantiate a browser plugin for the web browser.

BACKGROUND

Today, HTML5 media tags, such as <video> and <audio> tags are available to provide content providers with a simple way to deliver their audio and video content onto the web, and have it play on any web browser or browser-based device. The underlying functionality of the HTML media tags are referred to as HTML media elements. The <video> and <audio> tags enable an ecosystem where plugins are no longer required to play this content and end users have consistent access to it across their web-enabled devices. To date, content protection mechanisms to enable use of content that its owner wants to protect from unauthorized use are not supported in the context of HTML media tags.

BRIEF DESCRIPTION OF THE DRAWINGS

Non-limiting and non-exhaustive embodiments of the present invention are described with reference to the following drawings, in which.

DETAILED DESCRIPTION

Figure 1:
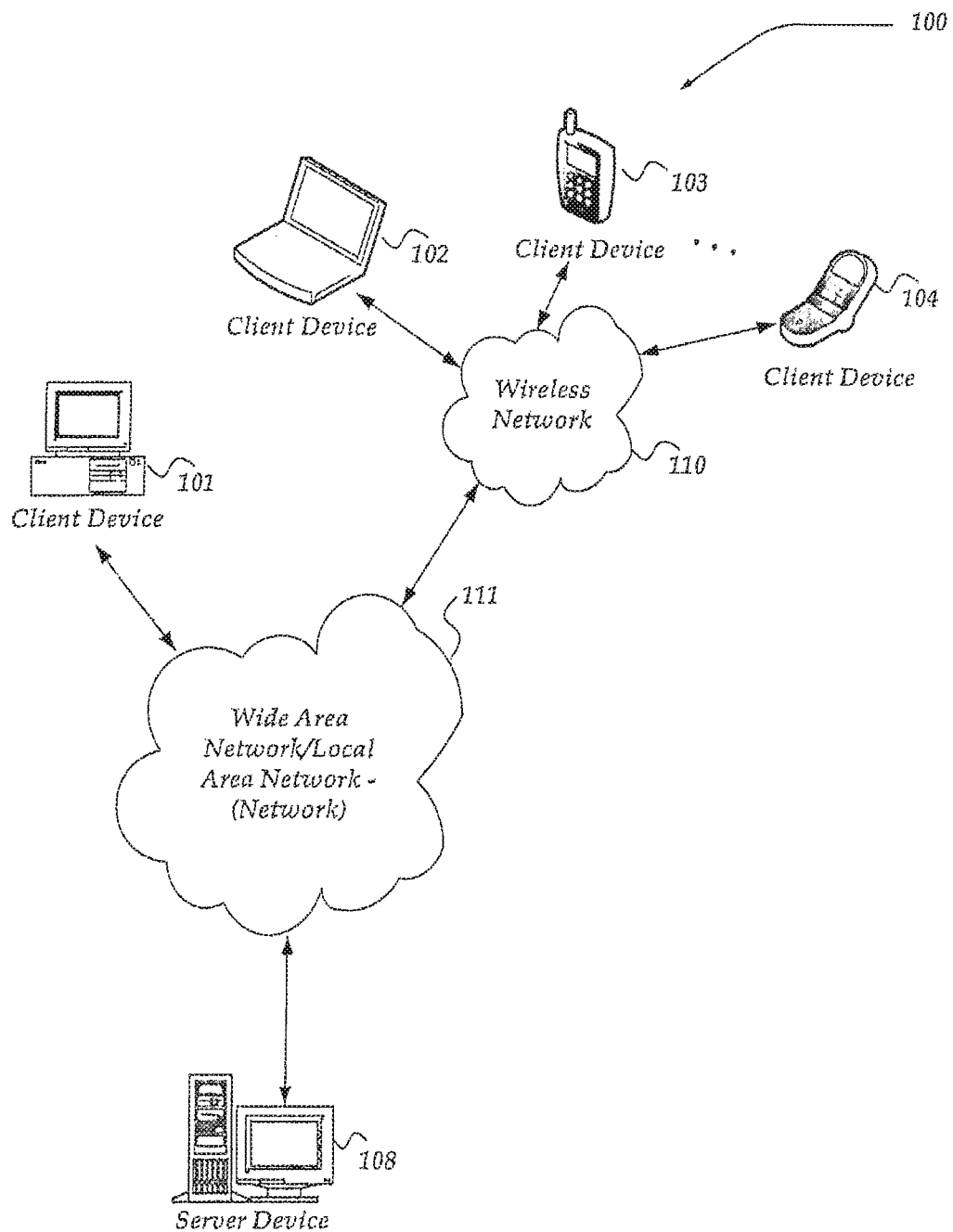
FIG. 1 illustrates a system diagram of one embodiment of an environment in which the embodiments of the invention may be practiced.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a." "an," and "the" includes plural reference, and the meaning of "in" includes "in" and "on." The phrase "in one embodiment." as used herein does not necessarily refer to the same embodiment, although it may. Similarly, the phrase "in some embodiments." as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on". "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "signal" means at least one current, voltage, charge, temperature, data, or other signal.

Briefly stated, the invention is related to a method, apparatus, and manufacture for instantiating a browser plugin. A client web browser of a client is employed to instantiate a browser plugin for the client web browser. Next, the client web browser is employed to obtain a reference to the browser plugin. Then, a command is given to the browser plugin via the reference to the browser plugin.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs") wide area networks ("WANs")—(network) 111, wireless network 110, client devices 101-104, and server device 108.

One embodiment of client devices 101-104 is described in more detail below in conjunction with FIG. 2. Generally, however, client devices 102-104 may include virtually any portable computing device capable of receiving and sending a message over a network, such as wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML). Wireless Markup Language (WML), WMLScript. JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Wireless network 110 is configured to couple client devices 102-104 and its components with network 111. Wireless network 110 contains at least one Access Point (not shown in FIG. 1). Wireless network 110 may include any of a variety of wireless sub-networks that may further overlay stand-alone ad-hoc networks, and the like. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including $2^{nd}$ (2G), $3^{rd}$ (3G), $4^{th}$ (4G), $5^{h}$ (5G) generation radio access for cellular systems. WLAN, Wireless Router (WR) mesh, and the like. Access technologies such as 2G, 3G, 4G. and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS). Enhanced Data GSM Environment (EDGE), Wideband Code Division Multiple Access (WCDMA), and the like.

Network 111 is configured to couple network devices with other computing devices, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Server device 108 is a network device. Devices that may operate as server 108 include various network devices, including, but not limited to personal computers, desktop computers, multiprocessor systems, microprocessor-based or programmable consumer electronics, network PCs, server devices, network appliances, and the like. It should be noted that while various devices are shown in a particular quantity, for example, server 108 is shown as one device, in various embodiments there may a different quantity of such devices, such two or more servers. There may even be two or more separate networks of servers. Thus, the invention is not to be construed as being limited to a single environment and other configurations, and architectures are also envisaged.

Illustrative Client Device

Figure 2:
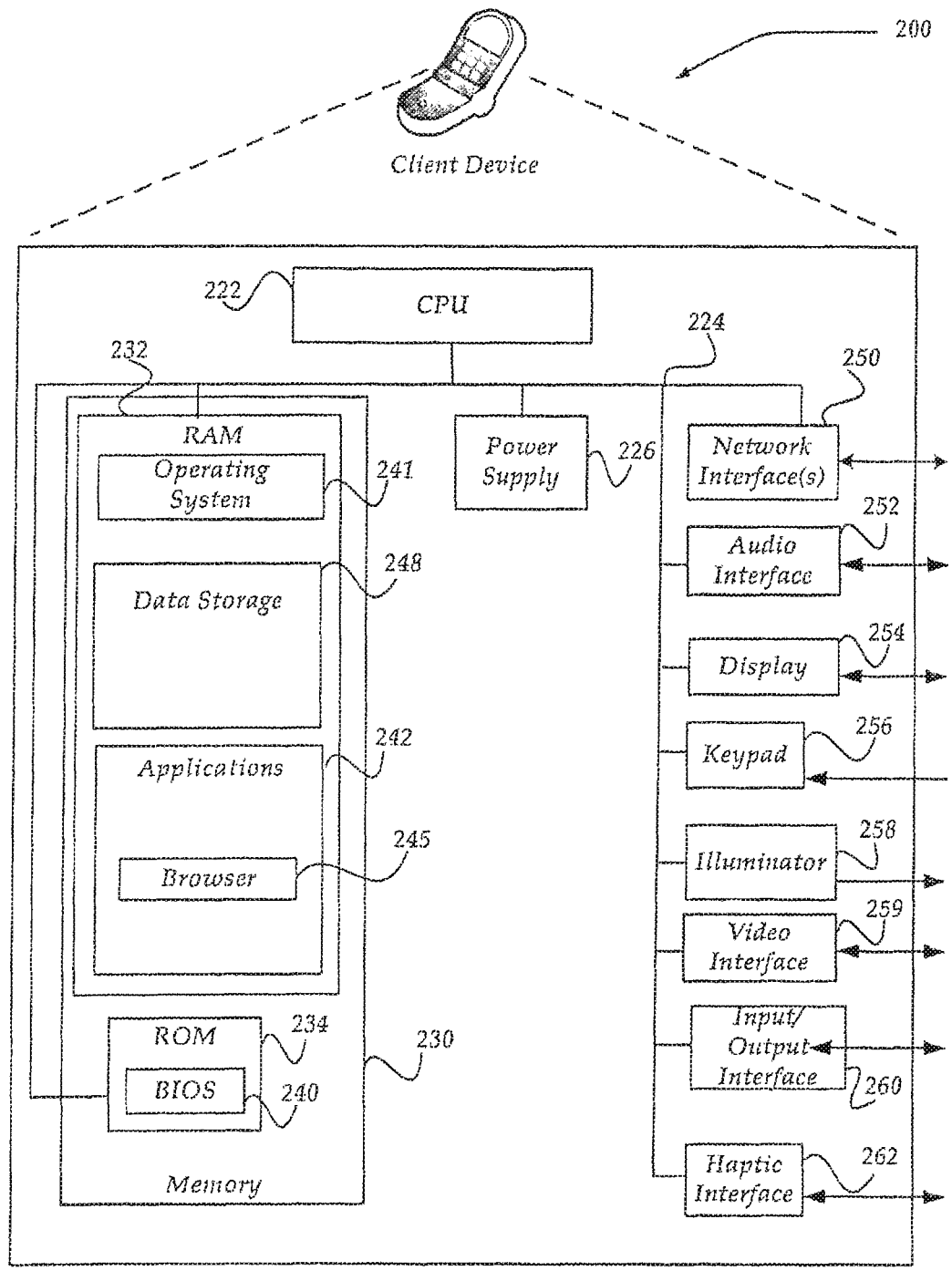
FIG. 2 shows one embodiment of a client device that may be included in the system of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1 (and, accordingly, may include virtually any type of client device).

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements anchor recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP). SMS, general packet radio service (GPRS), WAP, ultra wide band (UWB), IEEE 802.16 Worldwide Interoperability for Microwave Access (WiMax), SIP/RTP, or any of a variety of other wired or wireless communication protocols, including WiFi. Ethernet, and/or the like. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX"™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. Applications 242 may include computer executable instructions which, when executed by client device 200, perform actions. Other examples of application programs include calendars, search programs, email clients, IM applications. SMS applications, VOIP applications, contact managers, task managers, transcoders, database programs, word processing programs, security applications, spreadsheet programs, games, search programs, and so forth. In some embodiments, applications 242 may include web browser 245, a media stack for the web browser, a content decryption module (CDM) for, inter alia, decrypting media content for the media stack, and an application running on browser 245 such as a web application.

Various embodiments of client device 200 may include applications 242. These stored applications are processor-executable code encoded on a processor-readable medium, which, when executed by CPU 222, enable actions to performed in accordance with the processor-executable code. In some embodiments, web browser 245 (and/or other applications 242) may perform steps such as those illustrated in the flowcharts below.

Although the discussion of various embodiments above has described the performance of actions implemented in software, for example by means of processor-executable code encoded on a processor-readable medium, which, when executed by CPU 222, enable actions to performed in accordance with the processor-executable code, in various embodiments, actions, may in some embodiments, rather than being performed only by executed software, may instead be performed based on hardware only, or by a combination of hardware and software.

Illustrative Network Device

Figure 3:
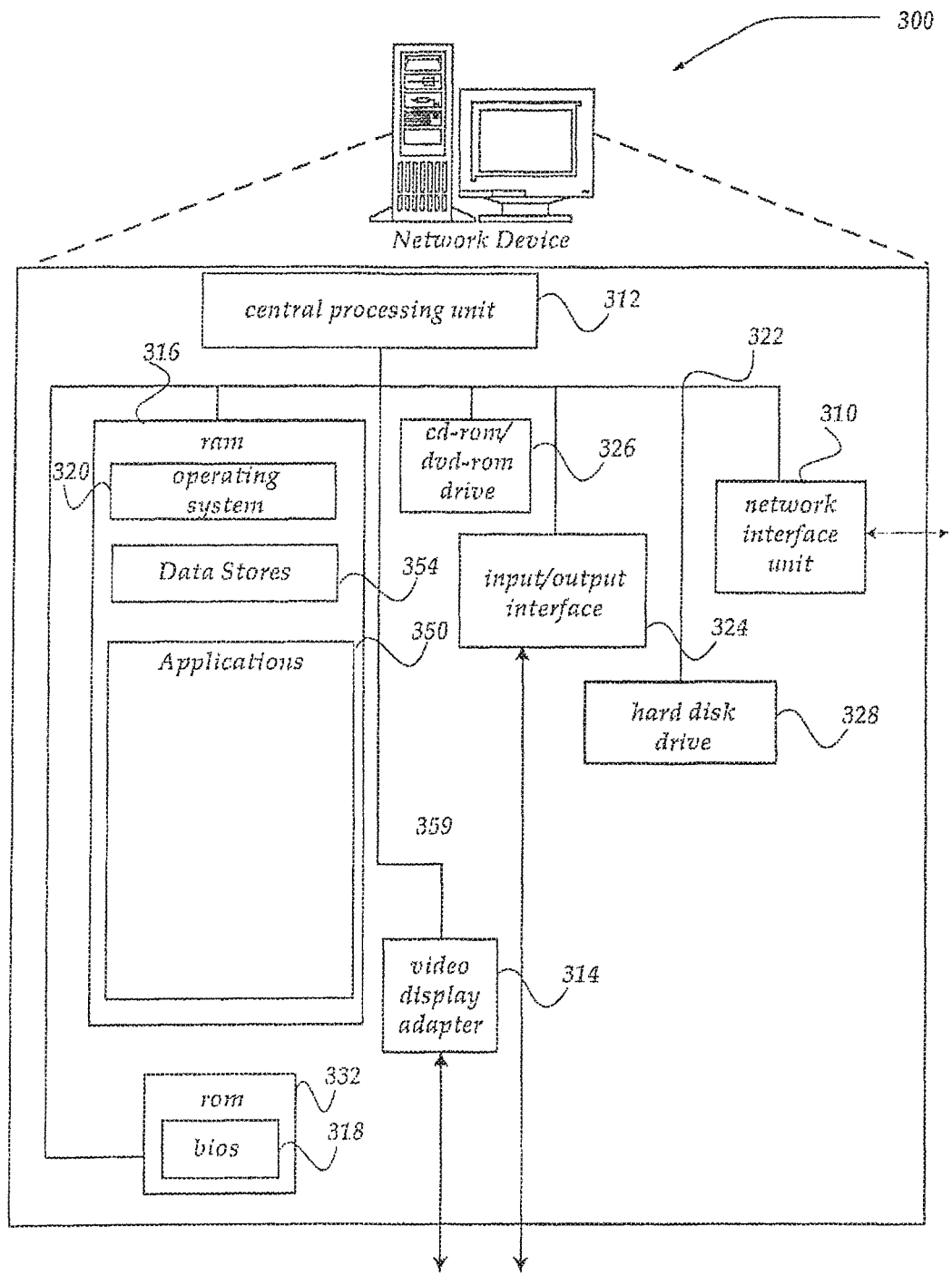
FIG. 3 illustrates one embodiment of a network device that may be included in the system of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, server 108 of FIG. 1.

Network device 300 may include processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory may store operating system 320 for controlling the operation of network device 300. Any general-purpose operating system may be employed. Basic input/output system ("BIOS") 318 may also be provided for controlling the low-level operation of network device 300. As illustrated in FIG. 3, network device 300 also can communicate with the Internet, or some other communications network, via network interface unit 310, which may be constructed for use with various communication protocols including the TCP/IP protocol. Network interface unit 310 is sometimes known as a transceiver, transceiving device, or network interface card (NIC).

The mass memory as described above illustrates another type of computer-readable/processor-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

Data stores 354 may include a database, text, spreadsheet, folder, file, or the like. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 may be loaded into mass memory and run on operating system 320. Examples of application programs may include transcoders, schedulers, calendars, database programs, word processing programs, Hypertext Transfer Protocol (HTTP) programs, customizable user interface programs. IPSec applications, encryption programs, authentication programs, security programs, SMS message servers, IM message servers, email servers, account managers, and so forth. In some embodiments, as discussed in greater detail below, application 350 may include applications for providing a content authorization service, and may provide a license to an authorized requesting client application, Generalized Operation The operation of certain aspects of the invention will now be described with respect to FIG. 4.

Figure 4:
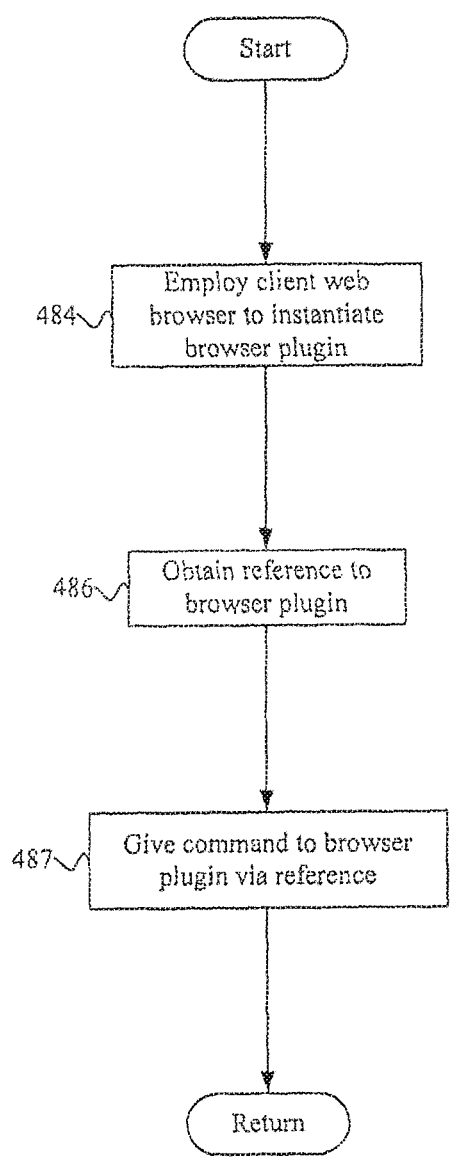
FIG. 4 shows a flowchart of an embodiment of a process.

FIG. 4 illustrates a flowchart of an embodiment of process 470. After a start block, the process proceeds to block 484, where a client web browser of a client is employed to instantiate a browser plugin for the client web browser. The process then moves to block 486, where the client web browser is employed to obtain a reference to the browser plugin. (In some embodiments, the act at block 486 happens inherently as a part of the act of block 484. In other embodiments, the acts at block 484 and block 486 are separate acts from each other.) The process then proceeds to block 487, where a command is given to the browser plugin via the reference to the browser plugin. In some embodiments, more than one such command may be given. The process then proceeds to a return block, where other processing is resumed.

In various embodiments, the browser plugin may be a browser plugin for performing virtually any web feature or browser feature. The browser plugin is instantiated by the web browser, not the web page. The browser plugin is a plugin for the browser, not a media engine plugin. The browser plugin is providing functionality for the browser rather than providing part of the page content. The browser plugin is an in-page plugin that is invoked by HTML. In some embodiments, the browser may instantiate the plugin by injecting code into the web page, but this is still the browser instantiating the browser plugin. By having the browser, rather than the web page, instantiate the browser plugin, there is no need for the web pages to include such elements or scripts within them (in some embodiments, the browser injects such elements or scripts into the web page, but in this case, the web page did not need to include such elements before the browser injects them into the web page). Because the browser, rather than the web page, instantiates the browser plugin, the pluggable functionality can be used on any web pages without modifications to the web pages.

In other various embodiments, rather than injecting the appropriate code into the page, the appropriate elements may instead instantiate a plugin directly by instantiating the native browser code that represents and manages the plugin, may inject the elements into the shadow DOM, and/or may include elements in a separate, hidden web page or frame.

In some embodiments, the browser plugin is not accessible by the web page. In some embodiments, the web page is not able to detect the presence of the browser plugin.

As discussed above, in some embodiments, the browser may inject the appropriate HTML. JavaScript, JavaScript variables and/or objects, etc. into the web page, appropriate elements into the DOM (page representation), or representations of the appropriate elements into the browser's internal representation of the page.

In some embodiments, the element it may be injected in a more "global" location, such as a <body> or <head> tag. In some embodiments, the browser may inject and/or run script that instantiates the browser plugin.

As discussed above, at block 486, the client web browser obtains a reference to the browser plugin. In some embodiments, the reference is a pointer to the browser plugin, such as a C++ pointer. In other embodiments, the reference to the plugin may be a name, type, or other identification to find and access the browser plugin at a subsequent time.

At block 487, the browser gives one or more commands to the browser plugin using the reference obtained at block 486. The nature of the command(s) varies in different embodiments depending on the nature of the browser plugin and the functions performed by the browser plugin, which may vary considerably in different embodiments.

The pluggable functionality of the browser plugin may extend capabilities for or related to one or more elements or even non-element capabilities in the web browser.

As discussed above, in some embodiments, the browser instantiates the browser plugin directly by instantiating the native browser code (e.g., C++ or other suitable native browser code) that represents and manages the browser plugins. This would also load the plugin code (e.g., DLUSO).

In some embodiments, the appropriate item may be injected within the element for which the plugin functionality is used. As discussed above, in some embodiments, this may be done by injecting the item into the shadow DOM of an element. By injecting the item into the shadow DOM of an element, the item is not accessible by other elements and script in the page, and they may not even be able to detect its presence.

In these embodiments, if an element has a shadow DOM by default (e.g., <video> elements in the layout/rendering engine software, e.g., WebKit), it may be injected into the existing shadow DOM.

In some embodiments, the browser may use mechanisms to hide the element or script from the web page's/application's elements and/or scripts. In some embodiments, this might include supporting a non-standard element or naming scheme that the browser uses to indicate that the element or script should not be accessible to elements and/or scripts in the page/application. For example, in some embodiments, elements may be named in a certain manner to indicate that elements named in that manner are not accessible to elements and/or scripts in the page/application.

In some embodiments, the browser may block every call that might access the hidden element, and for any call that would otherwise access the element, the access may be blocked, an exception may be thrown, or an indication that the element cannot be found may be provided in response to the call.

Even in embodiments in which elements are injected into the DOM to instantiate the plugin, the process is still such that it is entirely transparent to the web page that a plugin is being used in the background, and all of the normal functionality of the web page still works as normal.

In some embodiments, the browser plugin may be implemented using a plugin architecture such as Active X. Netscape Plugin Application Programming Interface (NPAPI), Pepper Plugin API (PPAPI), or the like.

Figure 5A:
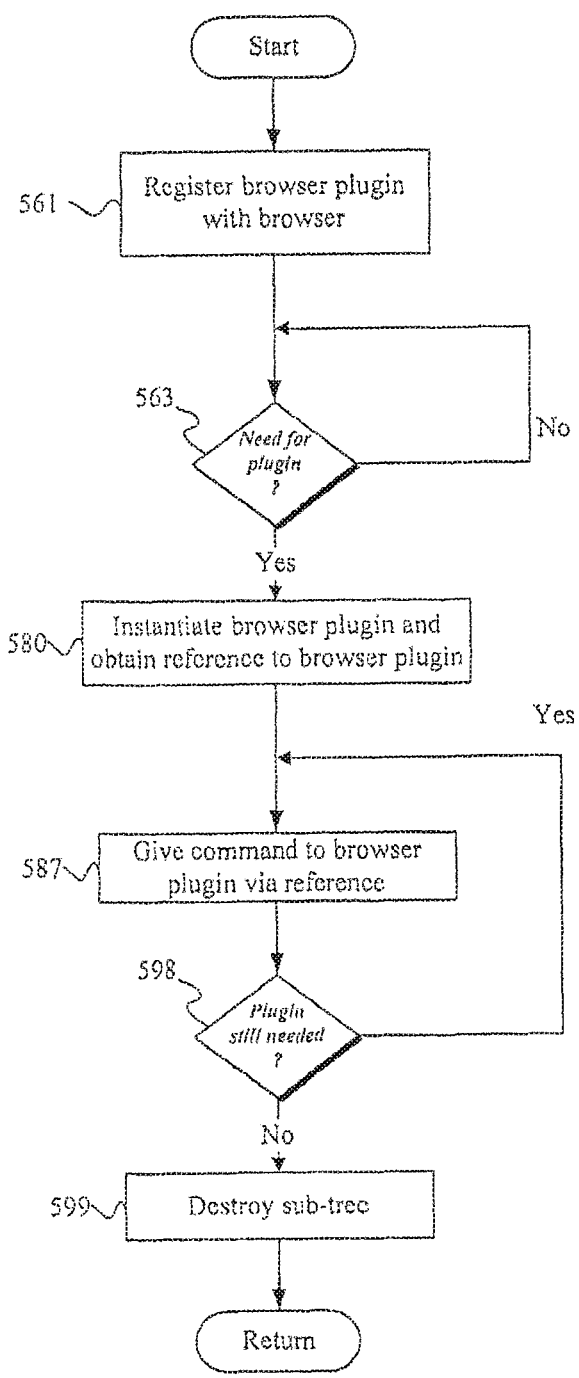
FIG. 5A illustrates a flowchart of an embodiment of a process that may be employed as an embodiment of process of FIG. 4.

FIG. 5A illustrates a flowchart of an embodiment of process 570, which may be employed as an embodiment of process 470 of FIG. 4. After a start block, the process proceeds to block 561, where a browser plugin is registered with a client web browser. The process then proceeds to decision block 563, where a determination is made as to whether there is a need for the browser plugin. If not, the process remains at decision block 563, where the need for the browser plugin is monitored. If, however, the determination at decision block 563 is positive, the process moves to block 580, where the browser plugin is instantiated and a reference to the browser plugin is obtained.

The process then advances to block 587, where a command is given to the browser plugin via the reference to the browser plugin. In some embodiments, there is a set of APIs employed in the plugin framework for which to give commands to the browser plugin via the reference. The process then moves to decision block 598, where a determination is made as to whether the browser plugin is still needed. If so, the process returns to block 587, where another command is given to block 587, and the process then advances to decision block 598 again.

At decision block 598, if it is determined that the browser plugin is no longer needed, the process proceeds to block 599, where the sub-tree of the DOM is destroyed. Destroying the sub-tree causes the sub-tree to be unrendered, so that the browser plugin instance is destroyed. The process then proceeds to a return block, where other processing is resumed.

In some embodiments, there is no step of destroying the sub-tree. For example, in some embodiments, an internal representation of the browser plugin is used.

Figure 5B:
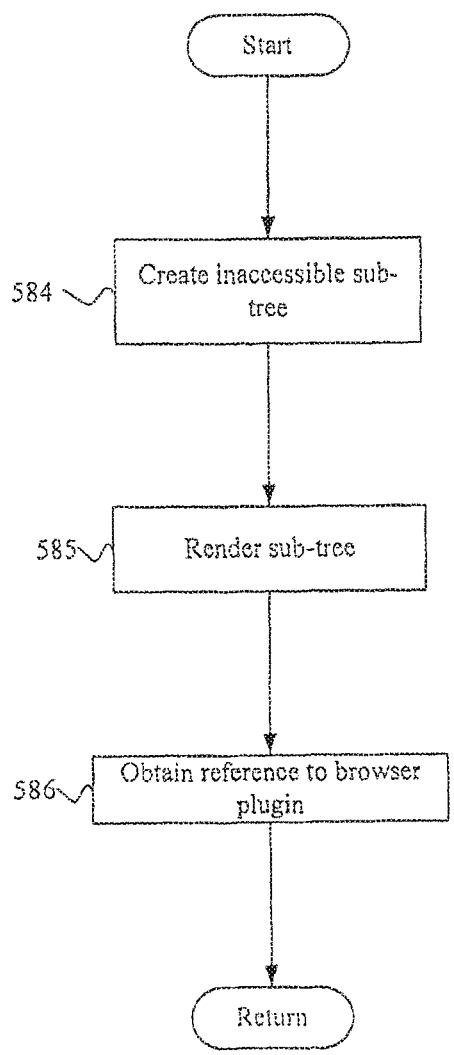
FIG. 5B illustrates a flowchart of an embodiment of a process that may be employed as an embodiment of part of the process of FIG. 5A.

FIG. 5B illustrates a flowchart of an embodiment of process 580B, which may be employed as an embodiment of the process at block 580 of FIG. 5A. After a start block, the process proceeds to block 584, where a sub-tree of the DOM is created. The sub-tree is included in the rendering of the document, and is therefore part of the rendering tree, but the sub-tree is inaccessible from the DOM. Also, the sub-tree includes one or more <object> or <embed> tags such that the tags, when rendered, will instantiate the browser plugin.

The process then moves to block 585, where the sub-tree is rendered, which causes the browser plugin to be rendered. The process then advances to block 586, where the browser gets a reference to the browser plugin. In some embodiments, the reference is provided in a callback as the browser plugin is being rendered. The process then proceeds to a return block, where other processing is resumed.

In some embodiments, the sub-tree in the DOM created at block 584 is in the shadow DOM. The code for rendering the shadow DOM is implemented inside the browser. In other embodiments, the sub-tree is created in the DOM of a separate, hidden, secret document (e.g., web page or frame) that is hidden and inaccessible from the primary web page/web application and that is not visible to the user. In some embodiments, the separate, hidden web page may be as simple as just, for example, nothing more than: <!DOCTYPE html><head><meta charset='UTF-8'></head><body><object type="+pluginType+"></object></body>.

In some embodiments, there is nothing regarding the browser plugin in the main page of the DOM, so that the only references to the browser plugin are in some portion of the browser.

At decision block 563, the need for a browser plugin is different in various embodiments. In some embodiments, the browser plugin could be required for any web page. In some embodiments, the need for the browser plugin could be triggered by the mark-up on the web page or because of some action the script took on the web page. The need may be triggered based on one or more specific actions happening or not happening in various embodiments.

In some embodiments, the browser plugin is a content decryption module (CDM), and at decision block 563, the determination is positive when an addKey function is called in a script of the web page, indicating that decryption/content protection is needed. In other embodiments, the determination may be based on some other step: For example, the determination may be a determination of whether the first step in the license request has occurred, where this first step is different in different embodiments. For example, in some embodiments, the process may be started by generateKeyRequest. or the creation of a MediaKeys object may begin the process.

Further, the invention is not limited to a determination related to the license request process, because this is just one specific embodiment of a browser plugin, and the browser plugin may be used for virtually any web function or browser function in various embodiments. For example, in some embodiments, the browser plugin provides the browser function of web syncing that syncs a user's bookmarks and/or tabs between computers. In other embodiments, the browser plugin may provide functionality for various web functions, such for the image tag in some embodiments. Further, even in the example of an embodiment in which the browser plugin is a CDM, in some embodiments, the addKey function is not necessarily required for indicating the need for the browser plugin—for example, it could be any cryptography tag that indicates the need for the CDM browser plugin.

In some embodiments, the browser plugin may only use or be allowed to use by design and/or policy a subset of the plugin infrastructure. For example, in some embodiments, certain browser plugin(s) may be denied network access in some embodiments, some browser plugin(s) may be allowed to be run only by particular restricted APIs within the browser. A browser plugin is still a browser plugin even if functionality is restricted and/or the set of supported APIs is changed in some way.

As discussed above, at block 561, the browser plugin is registered with the client web browser. The browser plugin is registered with the client web browser in such a way that the browser can load the browser plugin given a type string. In some embodiments, the browser maintains or populates a table of key system names (which may be strings in some embodiments) to plugin types (which may be strings in some embodiments).

In various embodiments, "key system names" could be something else entirely. For example, instead of a key system name, it some embodiments, the table may store a list of codes for the image tags. In some embodiments, a table is not needed.

Figure 6:
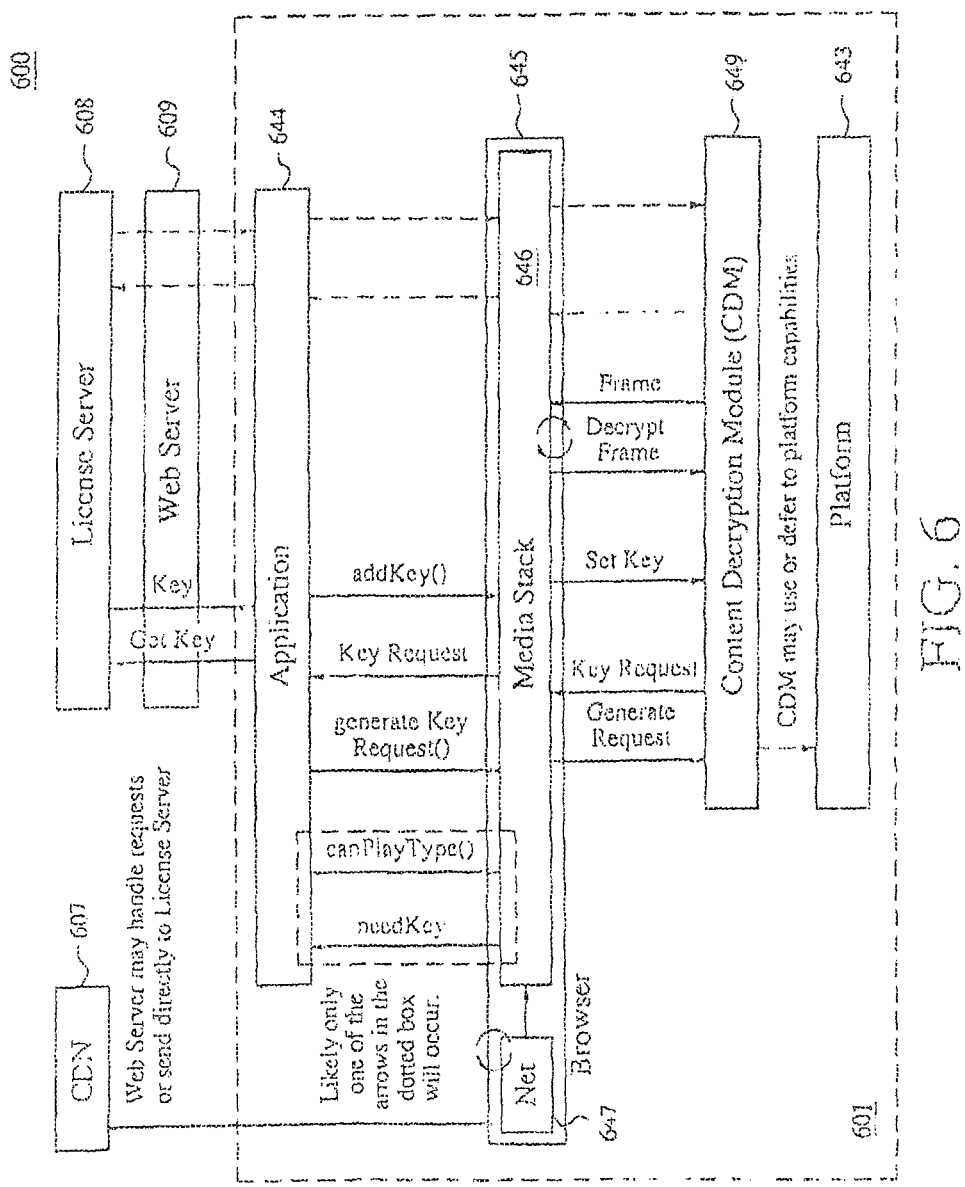
FIG. 6 shows a system that may be employed as an embodiment of the system of FIG. 1.

FIG. 6 shows system 600, which may be employed as an embodiment of system 100 of FIG. 1. System 600 includes license server 608, web server 609, content delivery network (CDN) 607, and client device 601. License server 608, web server 609, and CDN 607 may each, for example, be one or more server devices such as server device 108 of FIG. 1 and/or network device 300 of FIG. 3. Client device 601 may be, for example, an embodiment of client device 101-104 of FIG. 1 and/or client device 200 of FIG. 2.

Client device 601 includes application 644, content decryption module (CDM) 649, platform 643, and browser 645. Browser 645 includes media stack 646 and network stack (Net) 657.

CDM 649 may be employed as an embodiment of a browser plugin that is instantiated by a process such as one of the processes discussed above with regard to FIG. 4 and/or FIGS. 5A-B. In some embodiments. CDM 649 may be instantiated after a cryptographic function such as add-Key, or the like, is called.

CDM 649 performs decryption of media content in communication with media stack 646. Application 644 is a media playback control application.

Media stack 646 performs and/or controls decoding of media content (in conjunction with CDM 649, which performs the actual decoding in some embodiments). In some embodiments, media stack 646 is a set of connected media processing and rendering modules used for converting digital media data into human-perceptible representations (e.g., moving pictures and/or sound). Media stack 646 performs and/or controls functions such as de-multiplexing, decryption, and rendering in some embodiments (in conjunction with CDM 649 in some embodiments). In some embodiments, media stack 646 has substantially no other logic, but just renders what it is fed, and can therefore be used for all types of media playback applications in an interchangeable fashion. In some embodiments, certain functions such as decryption are not performed directly by media stack 646 itself, but by CDM 649, which is a separate module that performs certain functions, such as decryption, under the control of media stack 646.

Application 644 instructs media stack 646 to playback media content. In some embodiments, application 644 includes computer-executable code that implements substantially all of the logic required to play back media in a particular context, including user interface logic, subtitle control information, control of the acquisition of keys, and/or the like, but not processing and rendering. The processing and rendering is instead performed by media stack 646 and/or by separate modules under the control of media stack 646, including CDM 649. In some embodiments, the rendering is performed by a part of browser 645 other than media stack, 646. In other embodiments, the rendering is performed by another part (hardware or software) of the client. Together, media stack 646 and application 644 both reside in client device 601 and operate as a client media player. Media stack 646 and application 644 are distinct programs or binaries or libraries or scripts, etc., where media stack 646 can be re-used. Media stack 646 stack is part of an application framework, together with other modules that implement user input, graphics output, network I/O etc. The application framework exposes standard abstract interfaces for these functions to application 644. Application 644 may be a web application for playback of media using the HTML media elements identified in HTML5 (and/or future versions of HTML) by HTML media tags such as <media>, <video>, and <audio> (and/or future HTML media elements), where the web application includes a scripting language (e.g., JavaScript) and HTML or a mark-up language derived from HTML (e.g., mark-up languages based on supersets/subsets/slices/extensions of HTML).

This particular separation between media stack 646 (as part of the application framework) and application 644 is useful because the media stack implementation is typically specific to the type of computer hardware platform it executes on, and therefore is implemented in a way that is strongly connected to the operating system. The same holds for user input, graphics output, network I/O, etc. In some embodiments, media stack 646 is specific to a particular type of content protection. Application 644, however, can be the same across many different computer platforms when the underlying application framework abstracts access to user input, network, graphics, media stack, etc.

In some embodiments, when application 644 acquires a license, it does so in communication with one or more servers. In some embodiments, web server 608 may handle requests or send directly to license server 609. In some embodiments, application 644 may communicate directly with license server 609.

In some embodiments, media stack 646 may acquire media content specified by application 644 via network stack 647, where network stack 647 acquires the media content from CDN 607.

A content encryption key may be generated employing any of a number of encryption/decryption symmetric mechanisms, including, but not limited to Advanced Encryption Standard (AES). RSA, RC6. IDEA, DES, RC2, RC5. Skipjack, and any other symmetric encryption algorithm. Moreover, such encryption algorithms may use, where appropriate, cipher block chaining mode, cipher feedback mode, CBC cipher text stealing (CTS), CFB. OFB, counter mode, and/or any other block mode. In some embodiments, content encryption keys are generated employing an at least 128-bit AES encryption/decryption algorithm. However, content encryption key generation is not limited to symmetric key mechanisms, and asymmetric key mechanisms may also be employed without departing from the scope of the present invention. Typically, where the content encryption key is a symmetric encryption key, such content encryption keys are also referred to as decryption keys, as the same key may be used to both encrypt and to decrypt the content.

In additional to decryption, in various embodiments, CDM 649 may also perform such functions as DRM, content protection, license exchange or processing (including e.g., license request generation), decoding, de-multiplexing, and/or the like. In some embodiments, CDM 649 performs decoding for codecs not supported by browser 645. While media stack 646 generally performs rendering in many embodiments, in some embodiments, CDM 649 is employed to perform secure rendering.

In terms of DRM and/or content protection, in some embodiments, CDM 649 may protect the buffers and protect the decryption key through software methods. In some embodiments, CDM 649 has a secret key that CDM 649 uses to decrypt the license and obtain the content key, and CDM 649 protects CDM 649's secret key. In some embodiments, CDM 649 employs the content key to decrypt the corresponding media. In some embodiments. CDM 649 must also protect the content key once CDM 649 has decrypted the content key from the license. In some embodiments. CDM 649 also protects the compressed, decrypted frames. In some embodiments, the memory is scrambled such that the decrypted but compressed frames are not available in memory at any time. In some embodiments, the decompressed frames may also be protected. In some embodiments, CDM 649 may also protect and/or enforce other license provisions, such as the length of time the license allows particular video content to be viewed. In some embodiments. CDM 649 determines when the license has expired, and that a new license is needed when the license has expired.

Media stack 646 controls various functions of CDM 649, such as when to decrypt and decode, when to render if CDM 649 performs rendering, when to generate a license request, and the like. However, in some embodiments, CDM 649 may also perform DRM and/or content protection functions that are not necessarily directly controlled or initiated by media stack 646, such as those DRM and/or content protection functions discussed in the previous paragraph.

In some embodiments. CDM 649 performs decryption but not decoding. In some of these embodiments, media stack 646 may provide encrypted data to CDM 649, CDM 649 decrypts the media and provides the decrypted media to media stack 646, and media stack 646 then performs decoding on the decrypted media. In other embodiments, as previously discussed, CDM 649 performs both decryption and decoding. In some embodiments, after media stack 646 sends CDM 649 encrypted media. CDM 649 decrypts and decodes the encrypted media, and then sends the decrypted media to secure hardware (e.g., a secure surface) rather than returning the decrypted media to media stack 646. In some embodiments, CDM 649 uses a secure pipeline for decryption, decoding, and/or rendering.

In some embodiments, CDM 649 is sandboxed. In some embodiments. CDM 649 is sandboxed, but can perform particular unsandboxed operations via a special channel. In some embodiments, CDM 649 is sandboxed but can perform particular unsandboxed operations via a broker.

Content protection can involve accessing the system in ways web content usually should not need, which could lead to system vulnerabilities. If CDM 649 is sandboxed, these system vulnerabilities can be prevented. Also, sandboxing can provide privacy protection, so that CDM 649 cannot grab personal identifiable information or the like. By employing a sandboxed CDM that is a separate binary from browser 645, secure decryption and/or DRM may be performed without polluting browser 645 or using platform capabilities; platform independent decryption/DRM may be performed both in the logical (OS-independent) and architecture/binary sense; and content protection, decryption, and/or the like can be separate from browser 645 and the application 644, all while browser 645 handles playback.

Sandboxing only allows code execution that cannot make persistent changes to the computer, and sandboxed code execution cannot access information that is confidential. With sandboxing, code that is running cannot make changes to the system, and no matter what it does, does not have access to change the system. A sandboxed program typically cannot run commands that are not authorized, and might also be able to change the system, but only via strict APIs—the sandboxed code is unable create, modify, or delete a file using normal system calls. The sandboxed code can only change the system through an API, and the sandboxing entity can decide which kinds of accesses to allow.

In some embodiments, CDM 649 may be a sandboxed browser plug-in, and implemented as a Pepper/PPAPI plug-in. Traditionally, plug-ins, including Pepper, are used to display content on the page. However, in some embodiments, Pepper is just used as a framework to execute code separate from the web browser within a sandbox.

Use of PPAPI provides an architecture that enables running out-of-process, sandboxing, run-time loading. DLL/shared object loading, browser-provided functionality, sandbox escape functionality, and other capabilities for the browser plugin.

In some embodiments, CDM 649 is not sandboxed, and CDM 649 can write out to a secure pipeline. In some embodiments. CDM 649 is not sandboxed, and it does decryption and decoding in a secure pipeline. (Secure pipelines may also be used when the CDM is sandboxed).

In other embodiments, CDM 649 may be a browser plug-in implemented, for example, in Netscape Plugin API (NPAPI) or ActiveX.

Figure 7:
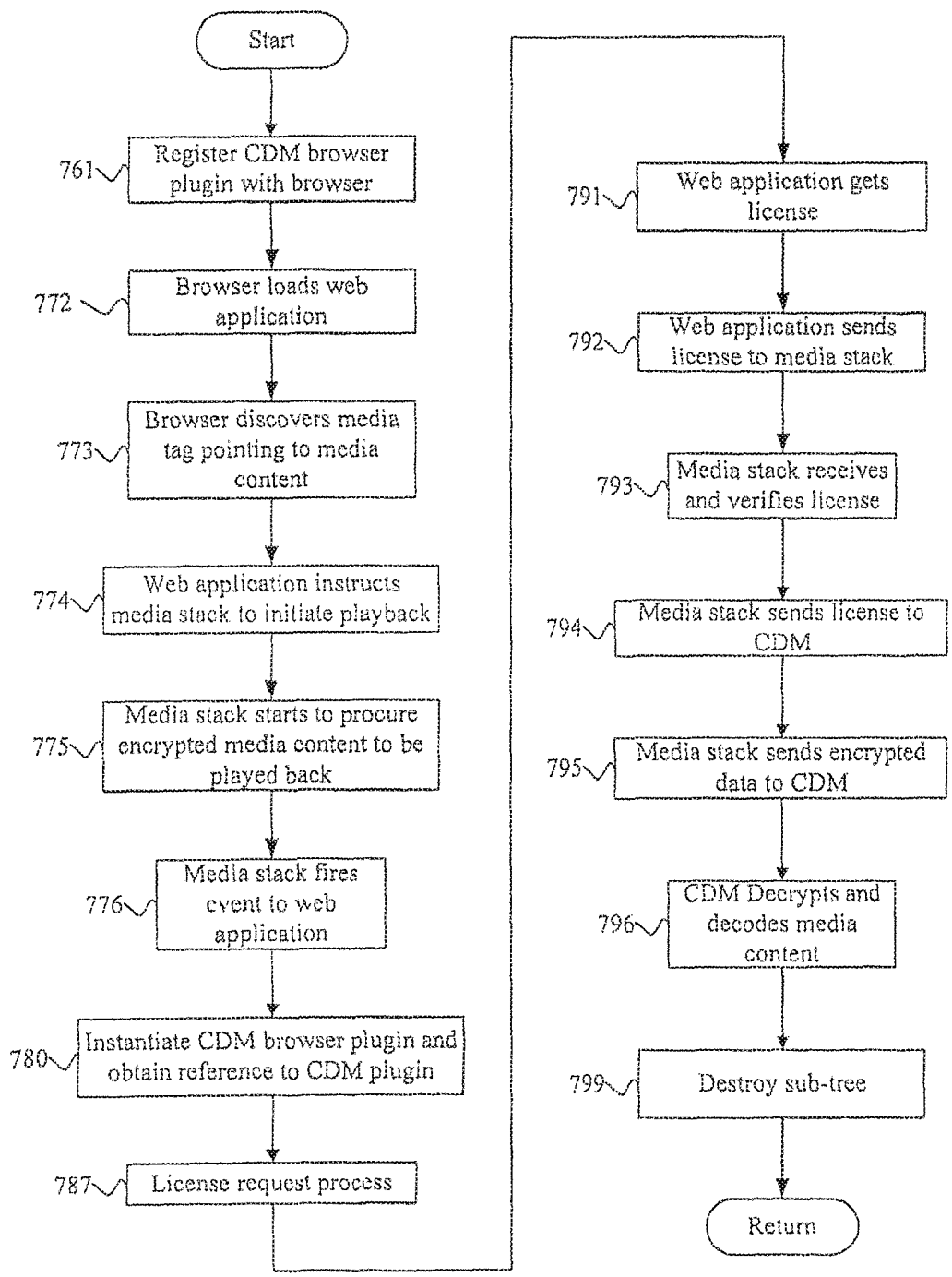
FIG. 7 illustrates a flowchart of an embodiment of the process of FIG. 4 and/or FIG. 5A.

FIG. 7 illustrates a flowchart of an embodiment of process 770, which may be employed as an embodiment of process 570 of FIG. 5A. After a start block, the process proceeds to block 761, where a CDM browser plugin is registered with a client web browser. The process then advances to block 772, where the client browser loads the web application. The web application may include a scripting language (e.g., JavaScript) and HTML. The process then moves to block 773, where the client browser discovers an HTML, media tag (e.g., <video> or <audio>) pointing to media content.

The process then advances to block 774, where the web application instructs the media stack of the client browser to initiate playback of the media content. In some embodiments, the web application may contain an autoplay attribute, in which case the browser parses the web application, discovers the autoplay attribute, and causes the media stack to autoplay the media content. In other embodiments, there is no autoplay attribute for the media content, and the web application instructs the media stack when to play media content. The media stack is instructed to play the media content in a time and manner that is in accordance with the web application. For example, in some embodiments, the web application instructs the media stack to play the media content when a "play" button is pressed by the user.

The process then proceeds to block 775, where the media stack starts to procure the media content that the media stack was instructed to play back (e.g., through file reading, or progressive or adaptive streaming).

The process then advances to block 776, where the media stack fires an event to the web application, where the event indicates that a license is needed to begin or continue playback of the media content. The process then proceeds to block 780, where the CDM browser plugin is instantiated, and a reference to the CDM browser plugin is obtained. In one embodiment, the process at block 780 occurs substantially as process 580 of FIG. 5B.

The process then advances to block 787, where the license request process occurs. In some embodiments, the web application sends a request for a license request to the media stack, and then the media stack sends the request for a license request to the CDM. In some embodiments, the CDM sends a license request to the media stack in response to receiving the license request from the media stack. In some embodiments, the license request must come from the CDM, because, in these embodiments, for security purposes, the license server requires a signature that only the CDM can provide in order to provide the license. Then the media stack sends the license request to the web application.

In some embodiments, the step of block 780 may occur after or during the step of block 787. For example, in some embodiments, the step at block 780 may be caused in response to a request to generate a license request or addKey within the step at block 787 that causes the step at block 780 to occur.

The process then moves to block 791, where the web application gets the license. As discussed in greater detail below, the web application may get the license in a variety of different ways in different embodiments. For example, in some embodiments, the application acquires the license via communication with one or more servers. In some embodiments, the license may be found locally or on a local network. In some embodiments, the license is acquired in accordance with a digital right management (DRM) scheme, or other content protection system. In other embodiments, the license could be stored in the web application. In some embodiments, a license is used to establish the content key in the media stack in content protection mechanisms where the key is not transmitted in the clear, and the key is extracted from or derived from the license data.

The web application is configurable to different types of content protection through the same framework. The web application defines a protocol or process and standardizes the interfaces so that the process could be configured to work with any of a variety of like underlying sort of technologies, but the interface is the same regardless of the content protection system used.

Since the license acquisition occurs not in the media stack but in the web application, the web application has control over the error handling for the license acquisition, and the web application can handle error conditions and the like.

The process then advances to block 792, where the web application sends the license to the media stack. The process then proceeds to block 793, where the media stack receives the license. The process then advances to block 794, where the media stack sends the license to the CDM. In some embodiments, the step at block 794 may be accomplished by commands given to the CDM via the reference. The media stack and the CDM are distinct binaries from each other. The process then moves to block 795, where the media stack sends encrypted data to the CDM. The encrypted data may be accompanied by parameters, including which license the encrypted data is associated with.

The process then proceeds to block 796, where the encrypted data is decrypted and decoded by the CDM. This may be accomplished by commands given to the CDM browser plugin via the reference. In some embodiments, the media content is first decrypted and then decoded, and in other embodiments, the media content is first decoded then decrypted. In some embodiments, the encrypted media content it sent from the media stack to the CDM one frame at a time, and the CDM decrypts and decodes the media content one frame at a time. In some embodiments, the CDM performs the decryption but not the decoding, and the decoding is instead performed by the media stack after the decrypted media is sent back to the media stack. What happens to the decrypted data varies in various embodiments. In some embodiments, the decrypted data is provided to the media stack for rendering. In some embodiments, the decrypted data is provided to a secure pipeline.

The process then advances to block 799, where the sub-tree of the DOM is destroyed. As previously discussed, in some embodiments, this step does not occur. The processing then proceeds to a return block, where other processing is resumed.

Many variations to the exact process flow illustrated in FIG. 7 are within the scope and spirit of the invention. For example, in some embodiments, the web application may determine that the media is encrypted. Accordingly, rather than the web application instructing the media stack to initiate playback right away, in this case the web application can instead get the license, and after the web application gets the license, the web application can instruct the media stack to initiate playback along with sending the media stack the data that includes the license. In some embodiments, the media tags may specify that the media is encrypted. As previously discussed, the steps may happen in a different order than shown in FIG. 7, for example, the step of block 774 may occur earlier or later than shown, as previously discussed. Further, in some embodiments, the application may determine without notification that a license is needed, rather than having to encounter something in the file before determining that a license is needed.

In some embodiments, such as a key rotation scheme, the media stack can fire an event each time a new key is needed, and the application can provide the new key to the media stack.

Process 770 may be applied to local content, to content that is downloaded and then played, and/or to streaming content. Process 770 is not specific to any particular form of content protection, but may be applied to various forms of DRM and other forms of content protection in different embodiments. Process 770 can support a wide range of control system types, including traditional DRM systems, conditional access systems, simple key establishment without the need for DRM servers, and key distribution systems based on DRM systems.

In some embodiments, process 770 may be used for viewing commercial content, including commercial content protected by a content protection mechanism such as DRM, where the commercial content may include movies or the like. In some embodiments, the media may be accessed via a webpage employing HTML5, or a future version of HTML that also supports media tags, where the media content is accessed in an HTML media tag such as <video> or <audio>. The media content, which is protected by some sort of content protection, such as encryption. DRM, and/or the like, can be accessed in a browser with an HTML media tag, with the media accessible, controllable, and configurable by the web application, where the media content can be streamed to the browser, downloaded, provided by the application, or local. In some embodiments, the web application provides application level flexibility to implement the authorization exchange, and all of the HTML5 security mechanisms may be used for network transactions.

In some embodiments, one attribute (authorizationData) and one event (authorizationNeeded) is added to the HTML5 media elements, as follows. In some of these embodiments, the design adds one new attribute to media elements named authorizationData. In some embodiments, the purpose of this attribute is to provide the CDM with the necessary information to initialize itself and enable playback of the requested content (e.g., a decryption key). In some embodiments, authorizationData may be a method that provides the data to the media element. The attribute authorizationData and the event authorizationNeeded may have different names in different embodiments. For example, in FIG. 6, they are referred to as addKey( ) [as a called function rather than an attribute] and needkey, respectively.

The authorizationNeeded event fires when the media stack underneath the media element discovers the need for fresh authorization data to start or continue playback. This event is accompanied by one or more blobs of data generated by the media stack that is potentially opaque to the application. The format of the data may be dependent on the content control mechanism(s) in the CDM and/or content format.

The authorizationNeeded event is an embodiment of the event fired at block 776 of process 770. In some embodiments, the authorizationNeeded event also contains supplemental data that is specific to the content control mechanism and/or content. The supplemental data can be opaque to the application—it only needs to be understood by the entity that creates the license data, which could be a network service in some embodiments.

The web application uses the information mentioned above to procure the required content control data (either through an application-specific mechanism or through a content-control-specific mechanism). This could happen through in-client processing, querying (e.g. a password), retrieval from storage, or a network request to a service. The authorizationNeeded event can fire multiple times during a single playback session, e.g., for key rotation.

The acquired content control data is provided to the media element via the authorizationData attribute. Once the data is present and correctly verified by the media stack, playout starts. In order to avoid playout delays due to latencies incurred when acquiring content control data, existing preload mechanisms can be used.

In some embodiments, the authorizationNeeded event contains an array of the following tuple: type and data, where type is an identifier of content control mechanism, and data is a byte array containing contents dependent on content control mechanism to enable application to acquire authorization data. In some embodiments, the authorizationData attribute includes a byte array in which the contents are dependent on content control mechanism, which enables the media stack to play content, and/or content data format.

In one possible embodiment of an application of the authorization data acquisition mechanism, content is encrypted using a content key, and a secure key distribution system stores the key. In some embodiments, the media stack contains client code of this secure key distribution system (though a pluggable mechanism or platform capabilities in some embodiments), and the content provider runs a key distribution service as a counterpart.

In some of these embodiments, the content control system uses: a "challenge" data structure generated on the client and a "license" data structure generated on the server using the content key and the client public key. The "challenge" data structure typically contains information about the content to be played for retrieval of the correct key, and information about the client CDM (client ID, client type, public key for encryption of the content key for transport).

In these embodiments, the media stack detects that the content is encrypted, and can be decrypted using the secure key distribution system's client CDM. The content key is acquired through a network transaction. Since the application has not yet set the authorizationData attribute of the media element to a valid "license" data structure, the media stack generates a "challenge" data structure and serializes it into a byte stream.

In these embodiments, the authorizationNeeded event gets the following two attributes: (1) type=(<string or numeric identifier for the secure key distribution system>); and (2) data=<challenge bytestream>, and fires.

In these embodiments, the application catches the event using a handler for this event. In the handler, the web application generates a request to the streaming service's license server, using an existing authentication mechanism (e.g., domain cookie) to authorize the request on the server, and the opaque data generated by the CDM. In some embodiments, the content control mechanism may choose to invalidate the authorization data after a certain number of uses, therefore disallowing replay of previously issued authorization data, and in consequence enforcing a requirement of fresh authorization for each playback.

In these embodiments, authorization depends on the streaming service's business rules. At the minimum, licenses could be handed out to everyone. In a service like this, the content still cannot be copied, and giving out rights to play back can be stopped at any time (e.g. when the service's distribution rights for this content end). Other services may require customer authentication, and even others may impose restrictions on number of devices and concurrent usage.

In these embodiments, if authorization is successful, the license server may use the content identification data in the "challenge" data structure to retrieve the content key for the content to be played from its database, and use the client key to generate a "license" data structure, which is handed back to the application in the response. The application installs the opaque license data into the authorizationData attribute of the media element, and playout starts after successful verification of the license data and extraction or derivation of the content key from the license data by the media stack. In some embodiments, the CDM is responsible for: the security of the decrypted content, the security of the content key, the security of the client CDM keys that can be used to decrypt license data, and secure disposal of the content key after playback has ended. In some embodiments, the opaque license data contains all of the necessary information to play all streams of the content in question that are authorized to the requesting user on the target device. For example, if different streams of some particular content are encrypted with different keys, the license contains all of the keys and the necessary information to associate it with the correct streams.

In some of these embodiments, the system can be extended to allow offline playback without changing the media stack implementation of the content control system. e.g. by retrieving the license from storage.

In these embodiments, a simple offline playback system allows the user to "pin" content to the client device while the device is connected. The content data (one embodiment thereof, e.g., at appropriate bitrate and quality for the target device) is downloaded from the server in its entirety and stored in local storage. The application uses a media element to initiate preload of playback for the content data in local storage, which triggers the authorization data retrieval mechanism. The authorization data is retrieved by the application as in the streaming use case, but not installed in the authorizationData attribute yet. It is cached in local storage until offline playback is initiated.

In these embodiments, if required for management of the stored authorization data, the content protection system can support the transmission of additional information on top of the opaque authorization data blob to the web application, e.g. content ID, expiration date etc., e.g. through the network protocol that also serves to transmit the authorizationData blob. This mechanism can be proprietary to the content protection system in some embodiments.

In these embodiments, when playback is initiated, the application retrieves the authorization data from its internal storage and installs it in the media element, allowing playout to proceed.

Returning to FIG. 6, as discussed above, the event authorizationNeeded and the attribute authorizationData are instead replaced by the event needkey and the function addKey( ), respectively. Application 644 may use Get Key to acquire a key from a server, which may in turn respond with an encrypted key via Key from the server to application 644. The key may be provided from application 644 to media stack 646 via addKey( ), and from media stack 646 to CDM 649 via SetKey.

In some embodiments, canPlayType( ) is extended to provide basic information about content control systems supported by the browser.

Media stack 646 may provide an encrypted frame for CDM 649 to decrypt via Decrypt Frame. CDM 649 then decrypts the encrypted frame, and provides the decrypted frame back to media stack 646 via Frame.

In some embodiments, a generateKeyRequest( ) function may be employed from Application 644 to media stack 646. A Key Request may be sent from media stack 646 to application 644 in response to the generateKeyRequest( ) function.

Figure 8:
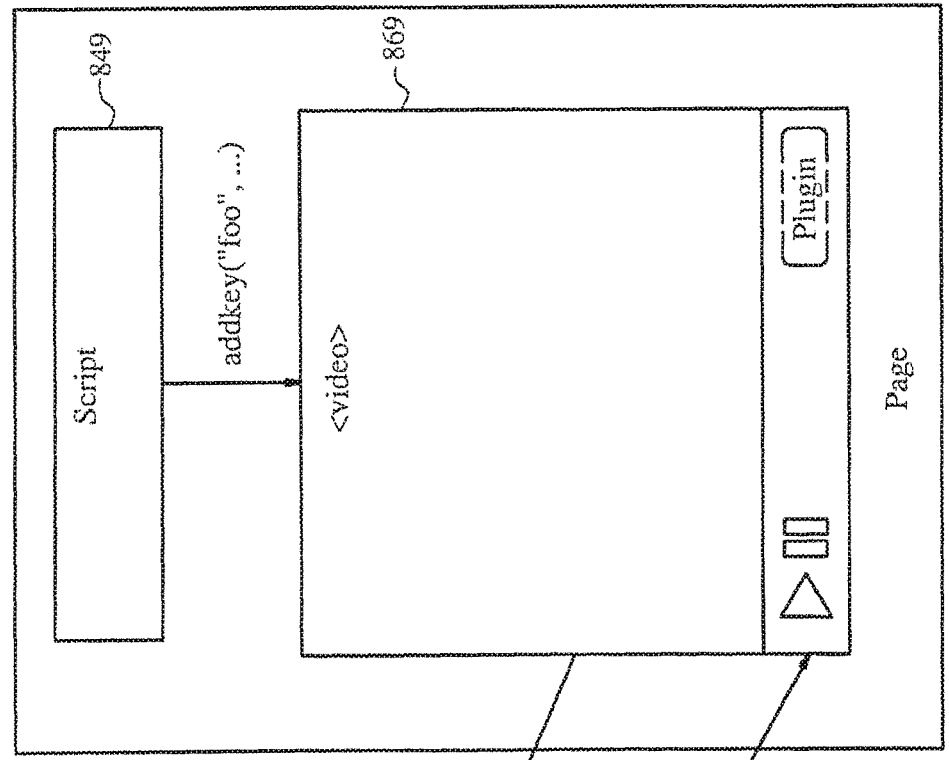
FIG. 8 shows an embodiment of a web page and a browser implementation of the web page, in accordance with aspects of the invention.
Figure 8:
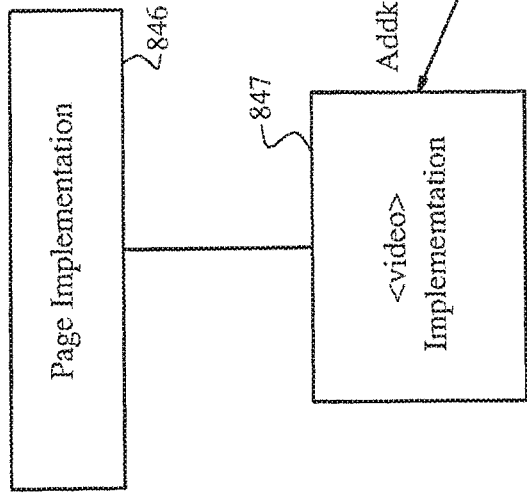

FIG. 8 shows an embodiment of web page 843 and a browser implementation 844 of the web page. FIG. 8 shows a particular embodiment in which the shadow DOM is employed. Browser implementation 844 resides in the web browser, and includes page implementation 846 and <video> implementation 847. Web page/DOM 843 includes script 849 and <video> tag 869. Web page 843 is loaded by the web browser.

When <video> tag 869 of DOM 843 is rendered, the rendered <video> element has controls that are not accessible via DOM 843, although the user can see the controls. The elements that render these controls, which are inaccessible to DOM 843, are provided during rendering by <video> implementation 847, which inserts the controls in the shadow DOM.

When AddKey is called by page/DOM 843, <video> implementation 847 intercepts the AddKey call. The <video> implementation 847 then inserts a tag (e.g., an object tag) for the plugin in the shadow DOM containing the controls, which causes instantiation of the browser plugin. The <video> implementation 847 then provides the browser plugin with the key.

In this way, in some embodiments, the tag for instantiating the browser plugin may be placed in existing shadow DOM that is already implemented for media control, and the tag (e.g., <object> tag) for instantiating the browser plugin reference can exist in the shadow DOM like a normal object tag but that is inaccessible by the DOM or the web application or the script.

The above specification, examples, and data provide a description of the manufacture and use of the composition of the invention. Since many embodiments of the invention can be made without departing from the spirit and scope of the invention, the invention also resides in the claims hereinafter appended.

What is claimed is:

1. A method, comprising:
    instantiating a module using an online content viewing application in response to identifying an action initiated by a web page, the web page being received by the online content viewing application, the module being instantiated based on one or more elements in a hidden resource, the hidden resource being generated by the online content viewing application, responsive to identifying the action, and hidden from the web page;
    obtaining, using the online content viewing application, a reference to the module, the reference being inaccessible from the received web page; and
    providing a command from the online content viewing application to the module via the reference.

2. The method of claim 1, wherein comprises identifying an action initiated by the web page comprises identifying media content in the web page, the method further comprising:
    generating the hidden resource responsive to identifying the media content, the hidden resource comprising a first reference to the media content;
    processing, by the online content viewing application, the hidden resource to initiate playback of the media content;
    wherein the module is instantiated using the online content viewing application in response to processing the hidden resource;
    wherein the command is provided in connection with the playback of the media content.

3. The method of claim 2, wherein identifying the media content comprises identifying an action initiated by the web page, wherein the module is a content decryption module (CDM) that operates on the media content separately from the playback of the media content, and wherein the action initiated by the received web page comprises an indication that content decryption or content protection is required for media content.

4. The method of claim 3, wherein the action initiated by the received web page comprises a cryptographic function being called by code provided by the received web page.

5. The method of claim 3, wherein the module is executed in a restricted application space, separated from the online content viewing application.

6. The method of claim 3, wherein the command is associated with decoding or decryption of the media content, the method further comprising:
    performing decoding or decryption of the media content using the CDM.

7. The method of claim 6, wherein the online content viewing application comprises a media stack, and wherein the CDM decodes or decrypts the media content in conjunction with the media stack, the media stack operating as part of a client media player to provide playback of the media content to a user interface.

8. The method of claim 7, further comprising:
    loading a media playback control application in response to a media tag provide by the received web page;
    receiving an indication of an instruction by the media playback control application for the media stack to initiate the playback of the media content;
    receiving an indication that a license is required for the media stack to initiate playback of the media content; and
    receiving an indication that the license was provided to the media stack by the media playback control application,
    wherein the playback of the media content is performed after the license is provided to the media stack.

9. The method of claim 8, further comprising:
    sending, by the media stack, the license to the CDM via the reference; and
    receiving an indication that the media content was decoded or decrypted using the CDM in response to receiving the license via the reference.

10. The method of claim 1, wherein instantiating the module comprises:
    injecting, by the online content viewing application, a code element into the received web page.

11. The method of claim 1, wherein instantiating the module comprises:

injecting, by the online content viewing application, a code element into a shadow document object model, a hidden web page, or a hidden web frame that is separate from and inaccessible by the received web page.

12. The method of claim 1, wherein the command to the module is a command associated with obtaining a key for decrypting encrypted media content.

13. The method of claim 1, wherein instantiating the module comprises generating a document object model (DOM) sub-tree for a predetermined DOM associated with the received web page, wherein elements of the sub-tree are inaccessible by elements of the predetermined DOM.

14. A system, comprising:
one or more processors; and
a memory comprising instructions stored thereon that, when executed by the one or more processors, perform operations comprising:
    instantiating a module using an online content viewing application in response to identifying an action initiated by a web page, the web page being received by the online content viewing application, the module being instantiated based on one or more elements in a hidden resource, the hidden resource being generated by the online content viewing application, responsive to identifying the action, and hidden from the web page;
    obtaining, using the online content viewing application, a reference to the module, the reference being inaccessible from the received web page; and
    providing a command from the online content viewing application to the module via the reference.

15. The system of claim 14, wherein the module is a content decryption module (CDM), and wherein the action initiated by the received web page comprises an indication that content decryption or content protection is required for media content, and wherein the operations further comprise:
    performing decoding or decryption of the media content using the CDM.

16. The system of claim 15, wherein the action initiated by the received web page comprises a cryptographic function being called by code provided by the received web page.

17. The system of claim 15, wherein the module is executed in a restricted application space, separated from the online content viewing application.

18. The system of claim 17, wherein the online content viewing application comprises a media stack, and wherein the CDM decodes or decrypts the media content in conjunction with the media stack, the media stack operating as part of a client media player to provide playback of the media content to a user interface.

19. The system of claim 18, wherein the operations further comprise:
    loading a media playback control application in response to a media tag provide by the received web page;
    receiving an indication of an instruction by the media playback control application for the media stack to initiate the playback of the media content;
    receiving an indication that a license is required for the media stack to initiate playback of the media content; and
    receiving an indication that the license was provided to the media stack by the media playback control application,
    wherein the playback of the media content is performed after the license is provided to the media stack.

20. The system of claim 19, wherein the operations further comprise:
    sending, by the media stack, the license to the CDM via the reference; and
    receiving an indication that the media content was decoded or decrypted using the CDM in response to receiving the license via the reference.

21. A non-transitory computer-readable medium comprising instructions stored thereon that, when executed, perform a method comprising:
    identifying media content in a web page received by an online content viewing application;
    generating, by an online viewing application responsive to identifying the media content, a hidden resource comprising a first reference to the media content, wherein the hidden resource is hidden from the web page;
    processing, by the online content viewing application, the hidden resource to initiate playback of the media content;
    instantiating a module using the online content viewing application in response to processing the hidden resource;
    obtaining, using the online content viewing application, a reference to the module, the reference being inaccessible from the received web page;
    providing, in connection with the playback of the media content, from the online content viewing application to the module, via the reference, a command for an operation associated with playback of the media content; and
    receiving an indication that the operation was performed based on the command.

* * * * *